United States Patent [19]

Van Der Hagen

[11] Patent Number: 4,578,855
[45] Date of Patent: Apr. 1, 1986

[54] ARTICLE AND METHOD FOR CONNECTING A REMOTE AIR CLEANER TO A CARBURETOR OR AN ENGINE FUEL METERING DEVICE OR SYSTEM

[75] Inventor: Gene E. Van Der Hagen, South Bend, Ind.

[73] Assignee: Eagle-Picher Industries, Inc., Cincinnati, Ohio

[21] Appl. No.: 517,845

[22] Filed: Jul. 27, 1983

Related U.S. Application Data

[63] Continuation-in-part of Ser. No. 400,374, Jul. 21, 1982, abandoned.

[51] Int. Cl.[4] ............................................. B23P 11/02
[52] U.S. Cl. ............................................. 29/447; 29/526 R; 138/109; 138/122; 264/230; 285/236; 285/381; 285/DIG. 10
[58] Field of Search ............................................. 29/447, 526 R; 174/DIG. 8; 264/230; 285/381, 236, DIG. 10; 138/109, 122, 132

[56] References Cited

U.S. PATENT DOCUMENTS

| | | | |
|---|---|---|---|
| 3,185,182 | 5/1965 | Waddell et al. | 138/122 |
| 3,222,441 | 12/1965 | Schlein | 264/230 |
| 3,516,694 | 6/1970 | Schwartz | 285/236 |
| 3,544,672 | 12/1970 | Goda et al. | 285/381 X |
| 3,567,259 | 3/1971 | Benson et al. | 264/230 |
| 3,773,087 | 11/1973 | Katayama | 285/236 |
| 3,849,864 | 11/1974 | Plummer | 264/230 |
| 3,874,712 | 4/1975 | Watson | 285/236 |
| 3,929,538 | 12/1975 | Diebel | 285/381 X |
| 4,141,576 | 2/1979 | Lupke et al. | 285/381 X |
| 4,232,712 | 11/1980 | Squires | 138/109 |

FOREIGN PATENT DOCUMENTS

| | | | |
|---|---|---|---|
| 2558478 | 6/1977 | Fed. Rep. of Germany | 285/381 |
| 907195 | 10/1962 | United Kingdom | 264/230 |

*Primary Examiner*—Charlie T. Moon
*Attorney, Agent, or Firm*—Wood, Herron & Evans

[57] ABSTRACT

A flexible connection from a rigid air inlet device to a rigid air cleaner inlet duct or a flexible connection from an air cleaner rigid outlet duct to a resonator rigid inlet duct or from a resonator rigid outlet duct to a fuel-air mixture metering device such as a carburetor or an electronic fuel injection device or system. The system described may or may not include a resonator. The connection is a flexible spiral wound wire duct. A flexible sleeve is heat shrunk onto the end of the wire duct, leaving a free end projecting from the duct for application to the rigid duct in any combination to satisfy air delivery to the fuel metering system.

4 Claims, 5 Drawing Figures

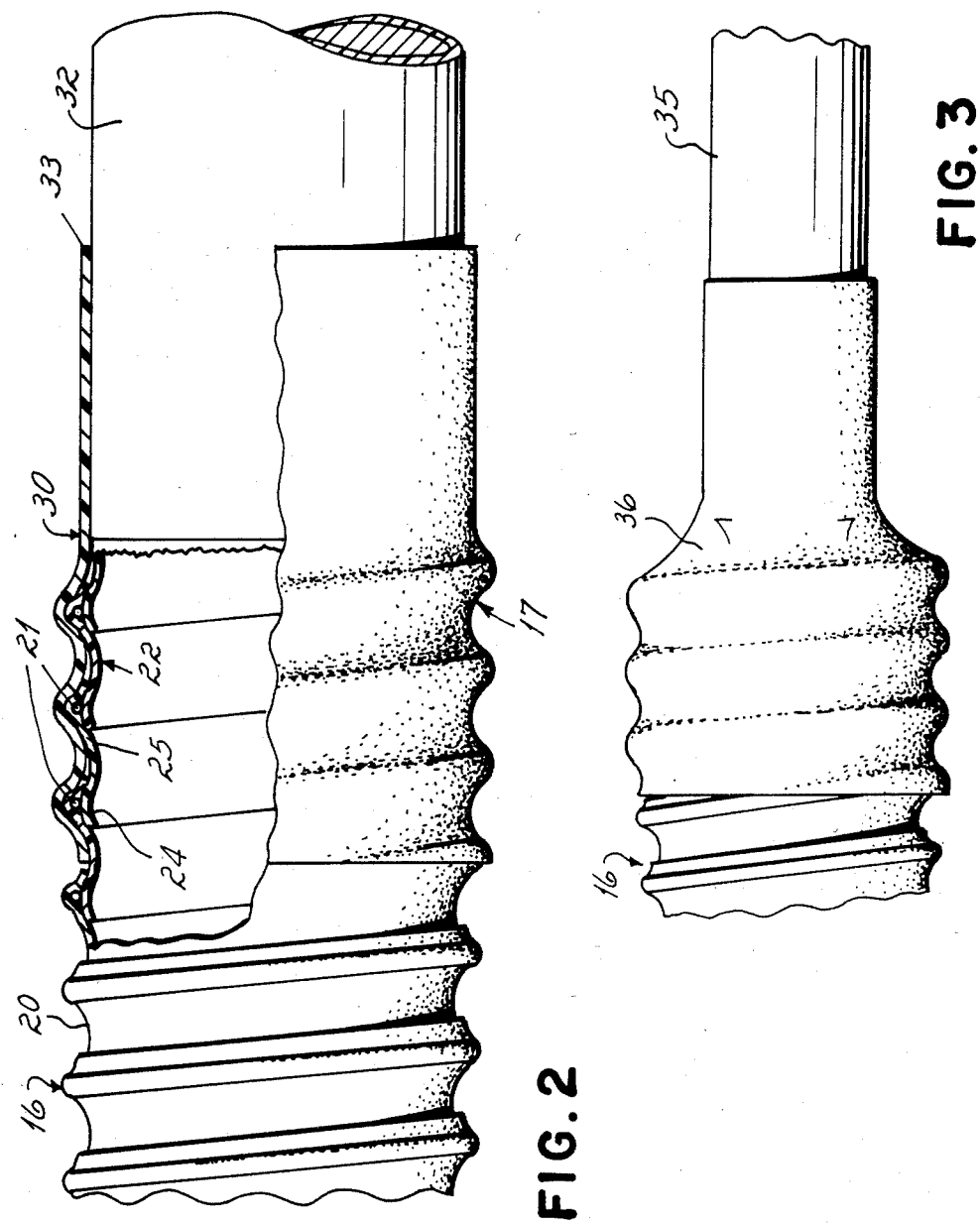

ARTICLE AND METHOD FOR CONNECTING A REMOTE AIR CLEANER TO A CARBURETOR OR AN ENGINE FUEL METERING DEVICE OR SYSTEM

This is a continuation-in-part of application Ser. No. 400,374, filed July 21, 1982, now abandoned.

This invention relates to the making of a connection between a flexible spiral wound wire duct and a rigid duct.

In certain automobile engines, an air cleaner is spaced from the carburetor or other fuel metering device/system and must be connected to the carburetor or fuel metering device/system in an airtight manner so as to bring fresh air to the carburetor or fuel metering device/system without the introduction of any particulate matter. It is desirable that the connection be flexible so as to accommodate the vibrations which necessarily occur during the operation of an automotive engine. The connection does not have to withstand severe pressures since during the operation of the engine there will not only be a partial vacuum applied between the carburetor and the fuel metering device/system and the remote air cleaner.

A material ideally suited for making the connection is a flexible spiral wound wire duct which is in common use in the automotive industry for making air conditioning connections and the like. The automotive applications heretofore involving the spiral wound wire duct have not required an airtight connection and hence the connection has employed a clamp only for the purpose of mechanically maintaining the flexible duct on the rigid duct to which it is connected. Such a clamp is disclosed in U.S. Pat. No. 3,874,712.

The need to provide an airtight connection to keep impurities out of the carburetor or fuel metering device/system has created a problem. One approach to a solution to the problem has been to employ a plastic tube and to heat-shrink that tube around the flexible duct and the rigid duct. The concept of shrinking a tubing around the flexible duct has been disclosed in the prior art as, for example, as disclosed in U.S. Pat. No. 4,141,576. That solution does not lend itself to the high speed production employed in the automotive industry because of the practical difficulty of heatshrinking a tube on a rigid duct during the assembly of an engine.

It has been an objective of the present invention to provide an improved method of making a flexible connection between two rigid ducts as, for example, the duct from a remote air cleaner and the duct from a carburetor or fuel metering device/system, the connection and the method of making it being suited for use in the automotive industry.

This objective of the invention is attained by applying a sleeve to each end of a flexible duct with a free end of the sleeve projecting beyond the end of the flexible duct. That sleeve is then heat-shrunk until it forms an airtight connection to the flexible duct. The free end is shrunk to the size of the duct to which it will be applied. Alternatively, the sleeve can be placed around a mandrel substantially of the size of the rigid duct to which it is to be applied, the mandrel abutting the end of the flexible duct. Thereafter, upon heat shrinking, the sleeve on one side will shrink down upon the flexible duct to form an airtight seal therewith and on the other side the sleeve will shrink down on the mandrel from which it will be removed after cooling. Alternatively, a single section of shrink tubing could be used which would encapsulate the entire length of the flexible duct with cuffs. The shrink tubing would be shrunk onto the flexible duct extending from each end of the flexible duct. This construction would eliminate all possibility of a leak between the cuffs and the flexible duct.

This assembly then can be shipped to the point at which the automobile engines are assembled and very rapidly applied to make the connection between the remote air cleaner and the carburetor or fuel metering device/system or such other application as may be desired. In making the application, the free end of the shrinkable sleeve projecting from the flexible duct is slid over the rigid duct of the carburetor, or fuel metering device/system, for example, and is clamped there by clamps which are conventional in this industry for applying fluid-tight connections to rigid ducts.

The objectives and several features of the invention will become more rapidly apparent from the following detailed description taken in conjunction with the accompanying drawings in which:

FIG. 2 is an elevational view partly in section of the invention;

FIG. 3 is an elevational view partly in section showing an alternate form of the invention;

Figure 1A:
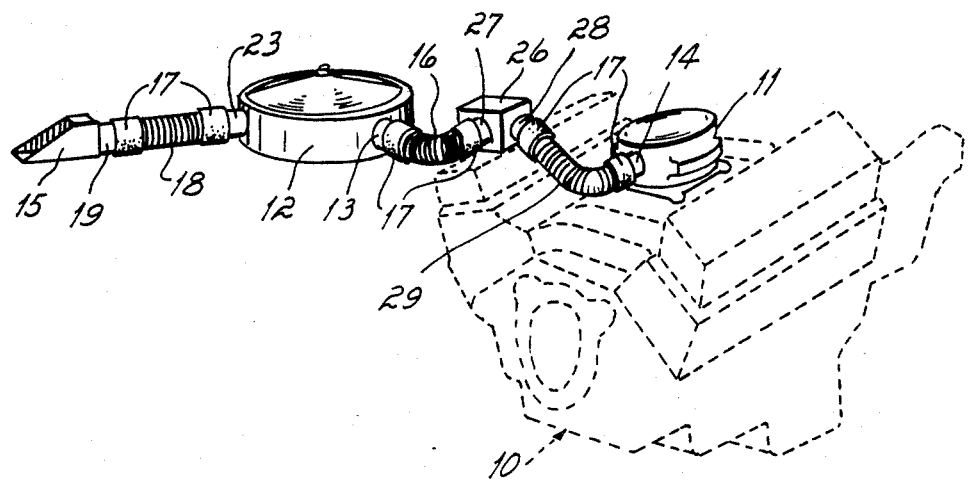
FIGS. 1A and 1B are diagrammatic perspective views of an automobile engine employing the present invention.

As indicated above, FIG. 1A is a very diagrammatic illustration of an automobile engine 10 having a carburetor 11, an intermediate fuel metering device or system 26, a remote air cleaner 12 and an air inlet duct 15. The air inlet duct 15 may be metal or rigid plastic of desired contour having a rigid outlet duct 19. The remote air cleaner 12 has a rigid inlet duct 23. The two rigid ducts 19 and 23 are interconnected by the flexible spiral wound duct 18. The ends of the flexible duct 18 are connected to the rigid ducts 19 and 23 by shrinkable tubing members 17.

The remote air cleaner 12 has a rigid outlet duct 13. The fuel metering device or system has a rigid inlet duct 27. The two rigid ducts 13 and 27 are interconnected by the flexible spiral wound wire reinforced duct 16. The ends of the flexible duct 16 are connected to the rigid ducts 13 and 27 by shrinkable tubing members 17.

The fuel metering device or system has a rigid outlet duct 28. The carburetor 11 has a rigid inlet duct 14. The two rigid ducts 28 and 14 are interconnected by the flexible spiral wound wire reinforced duct 29. The ends of the flexible duct 29 are connected to the rigid ducts 28 and 14 by shrinkable tubing members 17.

Figure 1B:
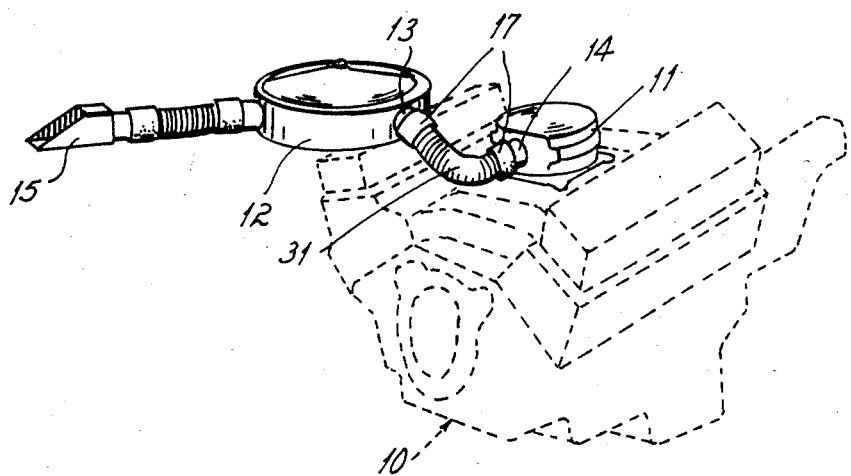

The above-described system is only used on engines using electronic fuel injection systems or computer controlling devices. Further, the use of air inlet duct 15 and the flexible tube 18 are not necessarily required for all such engine fuel system designs, even those as described in FIG. 1B. A simpler system is shown in FIG. 1B.

FIG. 1B is again a very diagrammatic illustration of an automobile engine 10 having a carburetor 11, a remote air cleaner 12 and an air inlet duct 15.

The connection from air inlet duct 15 to remote air cleaner 12 is the same as described for FIG. 1A.

The remote air cleaner 12 has a rigid outlet duct 13. The carburetor 11 has a rigid inlet duct 14. The two rigid ducts 13 and 14 are interconnected by the flexible spiral wound wire reinforced duct 31 are connected to the rigid duct 13 and 14 by shrinkable tubing members 17.

The structure of the flexible duct and the shrinkable tubing is best illustrated in FIG. 2. There, it can be seen that the flexible duct presents a corrugated uneven surface 20 which arises from the method of manufacturing the duct. It can be seen that a helical wire 21 is sandwiched between the adjacent convolutions of an elastomeric strip 22. Each convolution has, as viewed in FIG. 2, a portion 24 extending to the left which underlies the wire 21 and a portion 25 which extends toward the right which overlies the next convolution of the wire.

To join the duct 16 to a rigid duct of the carburetor or fuel metering device/system or remote air cleaner, the duct 16 is first inserted into a sleeve 30 of a heat-shrinkable material. The material may be a vinyl, a polyolefin, a Teflon, neoprene or Kynar. A polyolefin is preferred.

After the sleeve is slid over the hose, a mandrel 32 is inserted into the free end 33 of the sleeve. It may be advisable to apply a circular bead adhesive between the sleeve and the surface 20 of the duct 16 to provide further assurance of an airtight seal.

The assembly is then subjected to heat until the sleeve shrinks snugly down upon the surface 20 of the ducting as well as the mandrel 32. When the sleeve cools, the mandrel can be removed. Similar treatment is made to both ends of the flexible duct 16 so that both ends of the duct will have an airtight sleeve having a free end whose inside diameter is substantially the same as the outside diameter of the rigid duct of the carburetor or fuel metering device/system or remote air cleaner to which it is to be attached.

At the site of the assembly, the free ends of the sleeve are slipped on the rigid duct to which the rigid connection is to be applied and a circumferential clamp is applied and tightened down to make an airtight seal between the free end of the sleeve and the rigid duct.

Reference here has been made to the rigid duct as if it were necessarily attached to the carburetor or fuel metering device/system and the remote air cleaner, respectively. It should be understood that in practice other elements such as a resonator (not shown) may be in the path between the carburetor or fuel metering device/system and the remote air cleaner so that the connections may not be made directly to the carburetor or fuel metering device/system from the remote air cleaner. The connections will be made, however, to rigid duct with one side of the connection ultimately leading to the carburetor and the other side leading to the air cleaner.

The foregoing description of the shrinking of the sleeve onto the flexible ducting has also made reference to the shrinking of the sleeve onto a mandrel. It may be possible to eliminate the mandrel where the extent of the shrinking of the free end of the sleeve can be controlled so that it will always shrink, without the benefit of a mandrel, to substantially the outside diameter of the duct to which it is to be applied.

As shown in FIG. 3, the rigid duct may also be of a substantially different cross-sectional configuration and size as compared to the circular ducting 16. For example, a rigid duct 35 is shown with a rectangular cross section shape. That duct may be generally rectangular, square, oval or any shape without indentations on the sealing surface. The duct 35 shown has a width approximately three times the height of the flexible spiral wound wire duct 16 illustrated in FIG. 3 so that the cross-sectional area would substantially match that of the duct 16. In this embodiment, it would be necessary to use a mandrel of the size of the duct 35 to shrink the tube into the desired rectangular configuration. In this embodiment, the tube has a substantial transition 36 as it goes from the generally circular cross section of the duct 16 to the flat, rectangular cross section of the rigid duct 35.

Figure 4:
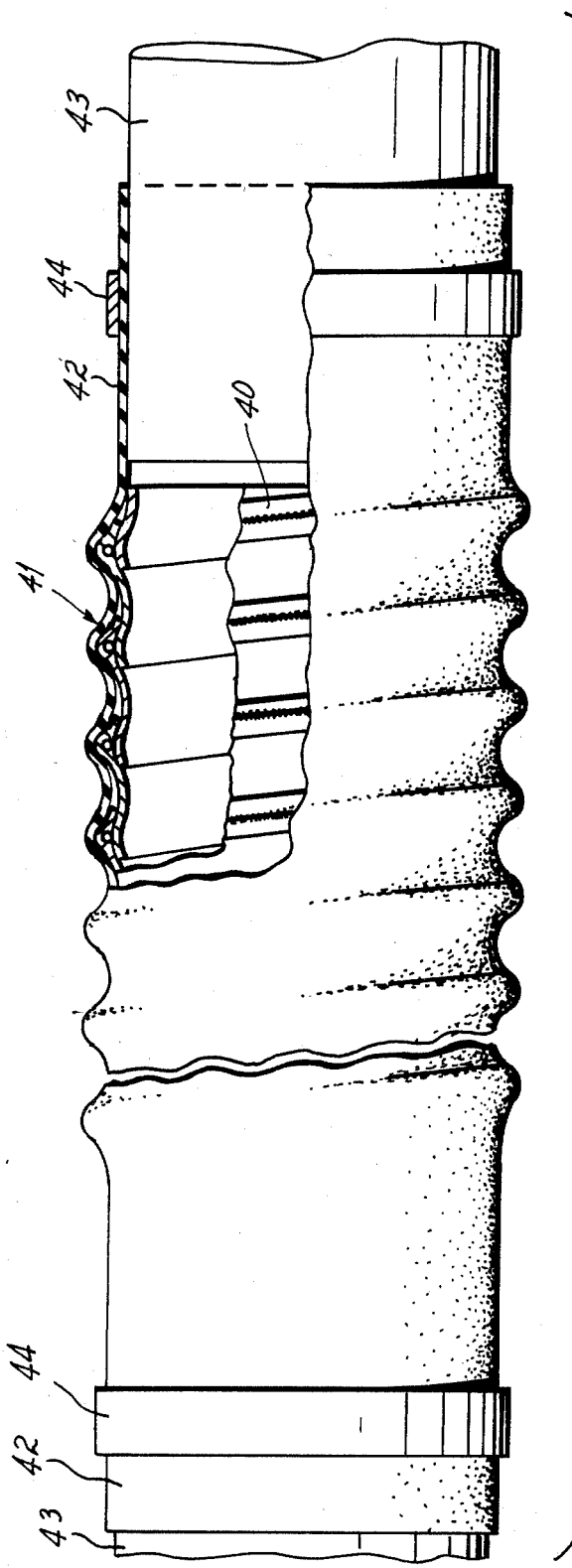
FIG. 4 is an elevational view partly in section showing an alternate form of the invention.

The invention thus far described admits of the possibility of leakage between the tube or sleeve and the flexible ducting. In the embodiment of FIG. 4, that possibility of leakage has been eliminated. In FIG. 4, the flexible ducting 40 is completely surrounded by a sleeve or tube 41 which is thereafter shrunk upon the ducting to assume the corrugated configuration of the ducting. The tubing 41 has projecting end portions 42 which are adapted to surround rigid duct indicated at 43 and to be clamped thereto by conventional clamping means 44. The free ends of the tubing 42 are shrunk to the desired size of the rigid duct 43 as previously described. By encapsulating the entire length of the flexible ducting, the possibility of leakage is completely eliminated.

Having described my invention, I claim:

1. The method of making a connection between a flexible spiral wound wire reinforced duct and a rigid cylindrical duct comprising the steps of,
    sliding a heat-shrinkable flexible sleeve onto the end of said spiral wound wire reinforced duct, while leaving an end projecting free from said duct,
    applying heat to said sleeve to shrink it onto said wire reinforced duct and to shrink the free end to approximately the diameter of said rigid duct, inserting said rigid duct into said free end,
    and then clamping said free end to said rigid duct.

2. The method as in claim 1 further comprising the step of prior to applying heat, inserting into the free end of said sleeve a mandrel having substantially the same outside dimension as said rigid duct whereby to shrink the free end of said sleeve to the dimension of said rigid duct.

3. The method as in claim 2 in which the mandrel onto which the sleeve is shrunk is rectangular, square, oval or any shape without indentations on the sealing surface.

4. The method of making a connection between a flexible spiral wound wire reinforced duct and two spaced rigid cylindrical ducts, comprising the steps of:
    sliding a shrinkable, flexible sleeve over the entire length of said spiral wound wire reinforced duct, leaving ends projecting free at both ends of said duct,
    applying heat to said sleeve to shrink it onto said wire reinforced duct and to shrink the free ends to approximately the diameter of the rigid ducts, inserting said rigid ducts into said free ends, and
    then clamping said free ends to said rigid ducts.

* * * * *

UNITED STATES PATENT AND TRADEMARK OFFICE
CERTIFICATE OF CORRECTION

PATENT NO.   :   4,578,855
DATED        :   April 1, 1986
INVENTOR(S)  :   Gene E. VanDer Hagen It is certified that error appears in the above-identified patent and that said Letters Patent is hereby corrected as shown below:

Title should be: METHOD OF MAKING A CONNECTION BETWEEN A FLEXIBLE SPIRAL WOUND WIRE REINFORCED DUCT AND A RIGID DUCT Column 1, line 23, delete "not."

Signed and Sealed this

Eighth Day of July 1986

[SEAL]

Attest:

DONALD J. QUIGG

Attesting Officer

Commissioner of Patents and Trademarks